G. D. BAILEY & F. E. RICE.
POSITIVE RELEASING CLUTCH.
APPLICATION FILED MAY 4, 1914.
1,266,903.
Patented May 21, 1918.
3 SHEETS—SHEET 1.
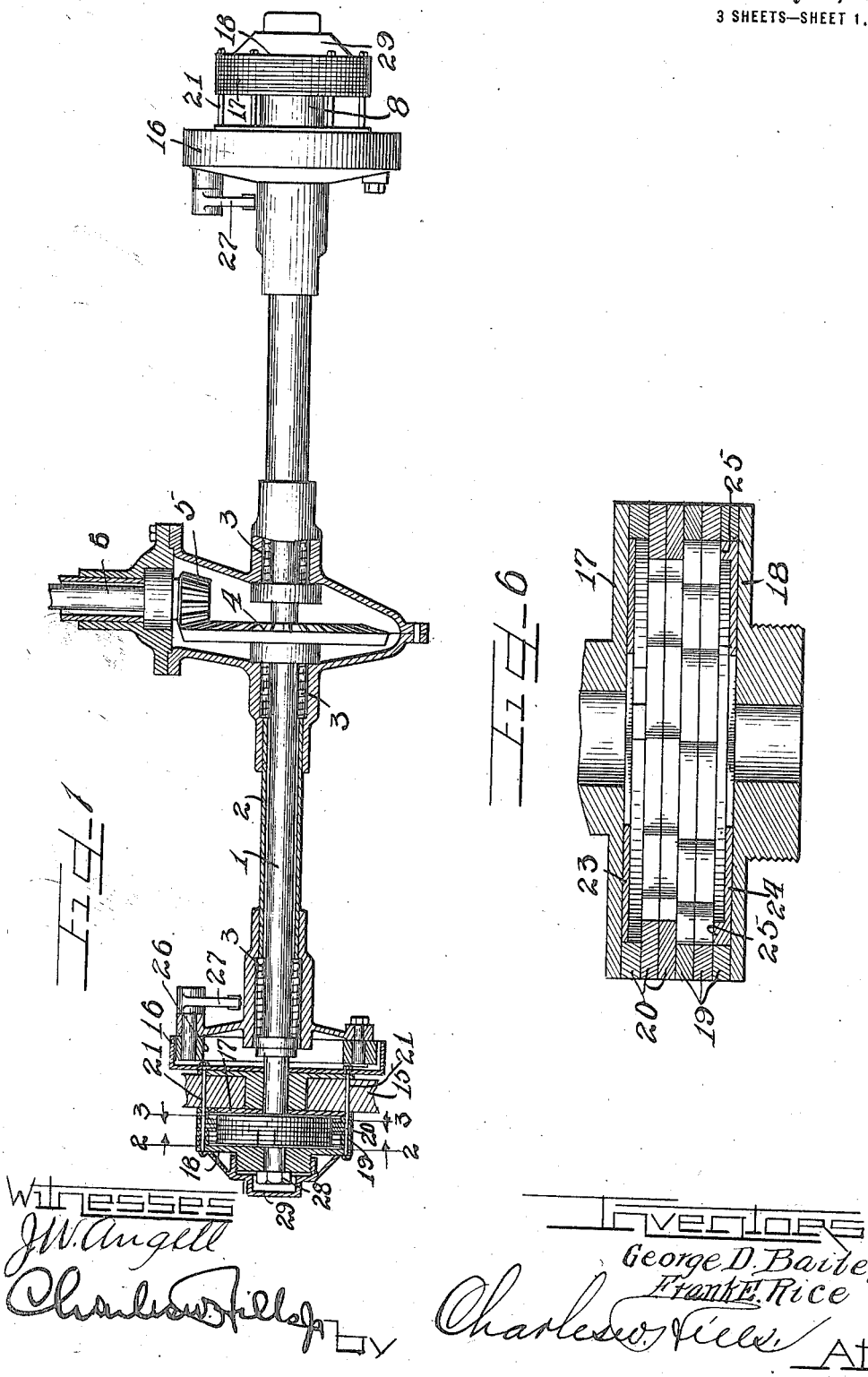

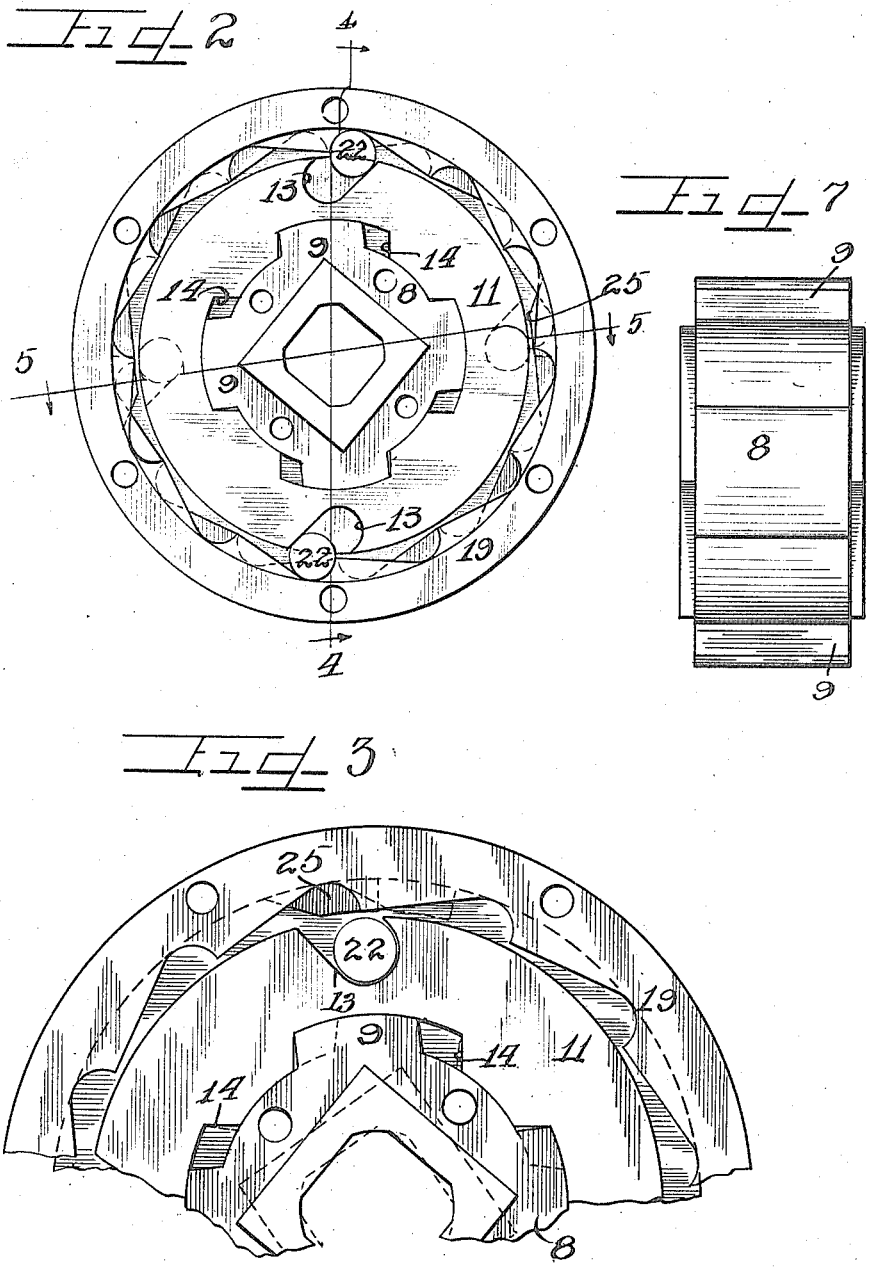

G. D. BAILEY & F. E. RICE.
POSITIVE RELEASING CLUTCH.
APPLICATION FILED MAY 4, 1914.
1,266,903.
Patented May 21, 1918.
3 SHEETS—SHEET 3.
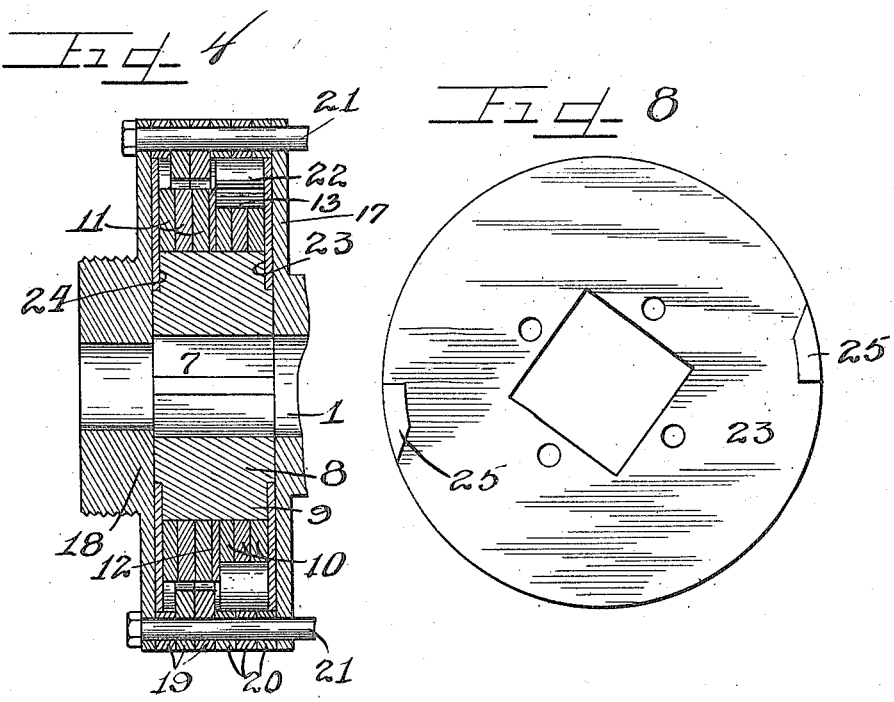
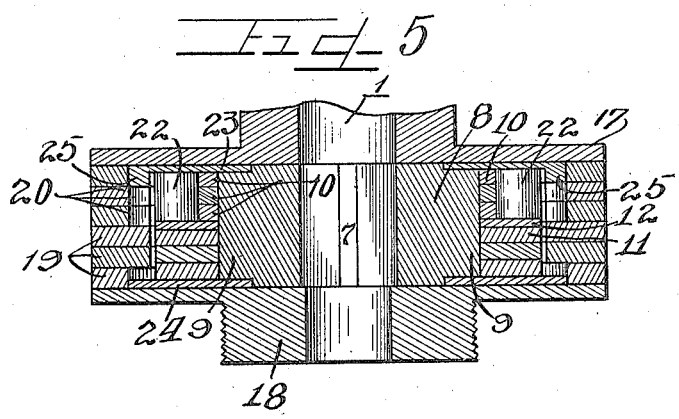

UNITED STATES PATENT OFFICE.

GEORGE D. BAILEY AND FRANK E. RICE, OF DETROIT, MICHIGAN, ASSIGNORS, BY MESNE ASSIGNMENTS, TO BAILEY NON-STALL DIFFERENTIAL CORPORATION, OF CHICAGO, ILLINOIS, A CORPORATION OF NEW YORK.

POSITIVE RELEASING-CLUTCH.

1,266,903.   Specification of Letters Patent.   Patented May 21, 1918.

Application filed May 4, 1914. Serial No. 836,073.

*To all whom it may concern:*

Be it known that we, GEORGE D. BAILEY and FRANK E. RICE, citizens of the United States, and residents of the city of Detroit, in the county of Wayne and State of Michigan, have invented certain new and useful Improvements in Positive Releasing-Clutches; and we do hereby declare that the following is a full, clear, and exact description of the same, reference being had to the accompanying drawings, and to the numerals of reference marked thereon, which form a part of this specification.

This mechanism relates to that class of devices capable of being used on motor cars for the driving wheels thereof in lieu of an ordinary gear differential, and one form of which is shown and described in the patent to George D. Bailey for "Releasing clutches", Patent No. 1,164,627, issued Dec. 21st, 1915, and also in the patent to George D. Bailey and Frank E. Rice for "Built up releasable clutch mechanism", Patent No. 1,189,774, issued July 4th, 1916.

Heretofore in this type of mechanism the roller carrying or cam element has been provided with tortuous recesses, one for each of the rollers, which, when the direction of rotation of the axle was such that certain particular rollers were not used to effect driving engagement between the driving and driven members, said rollers were held inwardly at the inner ends of their respective slots, partly by gravity and partly by centrifugal force, owing to the peculiar shape of the slots. However, in this invention the roller carrying or cam element is provided with only very short slots and we employ positively actuated means for contacting the rollers to retain the same within said slots out of driving engagement for certain directions of rotation of the driving element or axle to which it is attached.

It is an object of this invention to construct a releasing clutch mechanism adapted to be connected between the axle and driving wheels of a motor car in lieu of a differential, whereby, with only a very slight relative movement of the axle in either direction, certain of the locking members are moved positively into position out of use, and others are moved into driving position.

It is also an object of this invention to construct a releasing clutch mechanism adapted to establish driving connection between an axle and a wheel for either direction of rotation, permitting the wheel to rotate free of the axle when the wheel rotates at a faster rate, and mechanism forming a part of the device to positively move certain of the interlocking members thereof into a position out of use for certain directions of rotation of the axle.

It is also an object of this invention to construct a device wherein a cam member is rigidly mounted upon the driving axle and carries roller locking members adapted to coact with a ratchet ring surrounding said member and secured to the vehicle wheel, whereby rotation of the axle serves first to retract certain of the locking members into position out of use, and to throw certain of the others into engagement to establish rigid driving engagement between the axle, the cam member, and said ratchet ring.

It is also an object of this invention to construct a device wherein a block is rigidly secured upon an axle with a cam element mounted on said block with a slight lost motion permitted therebetween, and a ratchet ring and rollers serving to establish driving connection between the cam element and a wheel.

It is a further object of this invention to construct a device wherein accidental movement of the locking members into locking position is prevented by positively actuated means which hold the same retracted and release the same immediately when the proper conditions inure.

The invention (in a preferred form) is illustrated in the drawings and hereinafter more fully described.

In the drawings:

Figure 1 is a view partly in section and partly in elevation of the driving axle of a motor car.

Fig. 2 is a front elevation of the coacting driving and driven mechanisms taken on line 2—2 of Fig. 1.

Fig. 3 is a fragmentary enlarged view of the opposite side thereof, taken on line 3—3 of Fig. 1.

Fig. 4 is a section taken on line 4—4 of Fig. 2.

Fig. 5 is a section taken on line 5—5 of Fig. 2.

Fig. 6 is a view similar to Fig. 5, with the interior driving cam member omitted.

Fig. 7 is an end view of a quadrant block, which is rigid upon the driving axle, and drives the cam member.

Fig. 8 is a face view of one of the roller retaining plates.

As shown in the drawings:

The reference numeral 1, indicates a one-piece rear driving axle, which is journaled in a suitable housing 2, upon roller bearings 3, disposed at convenient points therein. For the purpose of driving said axle a bevel gear 4 is rigidly secured thereon, and meshes with a small bevel pinion 5, which is rigidly secured upon the end of the driving shaft 6, of an automobile. Near its ends said axle is squared, as denoted by the reference numeral 7, in Figs. 4 and 5, and rigidly, but removably, mounted thereon is a member 8, provided with four radial abutments or projections 9. A cam or roller carrying member built up of a plurality of stamped plates 10 and 11, respectively, with a separating or parting plate 12, disposed therebetween, and with the slots 13, in said respective stamped plates directed in opposite directions, is mounted upon said member 8, with the enlarged recesses 14, engaging over the abutments 9, thereon to permit slight play to take place therebetween.

A wheel 15 is journaled near each end upon said axle and secured on the inner side of each wheel is a brake drum 16. A face plate 17 is mounted on the outer surface of said wheel, and confined between said plate 17, and a hub plate 18, are a plurality of stamped sections 19 and 20 which afford a ratchet ring with the respective rows of teeth directed in opposite directions on each half of the inner periphery thereof. Bolts 21 extend through said wheel, said brake drum, said face plate 17, and said hub plate 18, and through suitable apertures in said sections 19 and 20, to hold the latter concentrically around the roller carrying cam members and rigidly attached to the wheel.

Hardened steel cylindrical rollers 22 are mounted in the recesses 13, of said cam members, and when rolled outwardly in said respective recesses and engaged by the teeth on said ratchet ring, serve to effect driving connection between the cam member and the ratchet ring. For the purpose of retaining certain of said rollers 22, retracted in their respective recesses when the axle is rotating in a certain direction, plates 23 and 24, respectively, are rigidly secured on each side of said member 8, with the plate 23, adjacent the face plate 17, and the plate 24, adjacent the hub plate 18. As illustrated in Fig. 8, each of said plates 23 and 24, is provided with projections 25, which extend inwardly a short distance over the respective cam members 10 and 11, the inclined edge of said projections acting to contact a roller which is in locking position to move the same back into its respective recess when a reverse movement of the axle takes place.

Internal expanding brakes 26, of any suitable type are mounted within each of said brake drums 16, and are actuatable by levers 27, provided for the purpose. Of course a nut 28, is threaded on the outer end of the axle to maintain the wheel engaged thereon and a hub cap 29, is adapted to be threaded onto the hub plate 18, to conceal and protect the nut.

The operation is as follows:

The drive is transmitted from the axle to the wheel through different members, two of which are caused to be locked together by rollers moved into position therebetween, and the other two of which are loosely connected with one another, whereby rotation of the shaft and consequently one of said members therewith, moves the same into driving position. The latter is the member 8, rigid upon the axle, but permitted a slight relative movement within the cam member of the device, due to the recesses 14, which are of greater length than the abutments 9. The slight play between the member 8 and the cam member is permitted for the purpose of allowing the respective projections 25, on the plates 23 and 24, as the case may be, to engage certain of the rollers 22, which are then in locking position to retract the same into their respective recesses when the direction of rotation of the axle is changed.

As already pointed out, the cam member is constructed in two parts divided by a separating plate 12, with the recesses for the rollers in one part faced in one direction for one direction of rotation of the axle, and the recess in the other position directed oppositely thereto for the opposite direction of rotation of the axle. Of course, the ratchet ring member is also divided into two parts 19 and 20, the respective teeth in each portion being directed oppositely to correspond with the oppositely directed recesses in the cam member, so that they may co-act with the proper rollers to afford locking engagement between the ring ratchet member and the cam member, irrespective of the direction of rotation of the axle. In the event of a vehicle turning a corner or striking a slippery pavement either wheel or both are permitted to rotate at a faster rate than the axle if such condition is enforced upon the wheels, owing to the fact that the rollers only lock the same with the cam member whenever the tendency for the cam member is to rotate faster than the wheel, and of course the rollers, which would ordinarily come into the operation, due to relative movement between the cam member and the ratchet ring or wheel, are held out of locking position by the respective projections 25. It is clear, therefore, that the drive is always imparted to the slower moving wheel, instead of the faster wheel, and not to the one to which the least resistance to rotation is offered, as is the case now with the type of differentials in common use.

We are aware that various details of construction may be varied through a wide range without departing from the principles of this invention, and we therefore do not purpose limiting the patent granted otherwise than necessitated by the prior art.

We claim as our invention:

1. In a device of the class described, an axle, a wheel journaled thereon, a clutch mechanism having a relative rotative movement with respect to said axle, adapted to effect driving connection between the axle and the wheel when the axle tends to rotate at a greater speed than the wheel, and means movable relative to said clutch mechanism positively disengaging the clutch mechanism when a reverse rotation of the axle takes place.

2. In a device of the class described, a releasable clutch mechanism for effecting driving engagement between an axle and its wheels in either direction of rotation, and positively actuated means movable relatively to certain parts of said clutch mechanism rigidly connected on the axle for disengaging certain parts of said clutch mechanism with a reverse rotation of the axle.

3. In a device of the class described the combination with the wheel and its axle, of mechanism transmitting a drive from the axle to the wheel but permitting the wheel to rotate faster than the axle, of means movable relative to said mechanism rigidly secured upon the axle and acting positively to disengage certain parts of said mechanism with rotation of the axle in one direction and permit engagement of other parts and to cause a reverse procedure of operations to take place with a reverse direction of rotation of the axle.

4. In a device of the class described the combination with a wheel journaled on its axle, of a member rigidly secured upon the axle, a cam thereon having a slight relative rotative movement with respect thereto, abutments on said member adapted to cause rotation of said cam, a ratchet ring secured to the wheel, and rollers carried by said cam adapted to be thrown into operation to cause a drive to be transmitted from the cam member to the ratchet ring to drive the wheel from the axle.

5. In a device of the class described, an axle, a member rigidly secured thereon, a cam on said member having a relative rotative movement with respect thereto adapted to be driven thereby, a ratchet ring mounted around said cam, rollers mounted in said cam adapted to interact with said ratchet ring to transmit a drive between said cam member and said ratchet ring, and mechanism associated with said member to move said rollers into position out of use with a certain direction of rotation of the axle.

In testimony whereof we have hereunto subscribed our names in the presence of two subscribing witnesses.

GEORGE D. BAILEY,
FRANK E. RICE.

Witnesses:
CHARLES W. HILLS, Jr.,
FRANK K. HUDSON.

Copies of this patent may be obtained for five cents each, by addressing the "Commissioner of Patents, Washington, D. C."